VARIABLE DRIVE FRICTION CONTROLLED RECORDING SYSTEM

Filed Sept. 19, 1960 2 Sheets-Sheet 1

Inventor:
Anton M. Springer,
by Irwin Salzer
Attorney

Aug. 15, 1961 A. M. SPRINGER 2,996,583

VARIABLE DRIVE FRICTION CONTROLLED RECORDING SYSTEM

Filed Sept. 19, 1960 2 Sheets-Sheet 2

Inventor:
Anton M. Springer,
by Irwin Salzer
Attorney

United States Patent Office 2,996,583

Patented Aug. 15, 1961

2,996,583

VARIABLE DRIVE FRICTION CONTROLLED RECORDING SYSTEM

Anton Marian Springer, Homburg vor der Hoehe, Germany, assignor to Telefonbau und Normalzeit G.m.b.H., a firm of Germany Filed Sept. 19, 1960, Ser. No. 57,053
Claims priority, application Germany Sept. 25, 1959
9 Claims. (Cl. 179—100.2)

This invention refers generally to play-back devices for magnetic tape records, or magnetic wire records of audible intelligence.

As seen from a more limited point of view this invention refers to play-back devices adapted to change the speed of play-back, i.e. to accelerate play-back, or decelerate play-back, without changing the pitch of the sounds involved in the original magnetic tape record or magnetic wire record.

Play-back devices of this description comprise a rotatable multiple head transducer for scanning tape or wire records and for converting changes of magnetic flux into corresponding changes of an electric quantity. They further comprise means for maintaining a fixed relative velocity between the rotatable multiple head transducer and the elongated magnetic audio record. This velocity is changed only if it is desired to change the time or speed of play-back, and this relative velocity remains normally constant during the entire play-back of a given magnetic audio record.

It is a general object of this invention to improve play-back devices of the aforementioned character.

A special object of this invention is to provide play-back devices of the aforementioned character which can be manufactured at relatively small cost.

Play-back devices of the aforementioned character have been disclosed in considerable detail in my copending patent applications Rotatable Magnetic Systems for Transforming Audio Currents, Ser. No. 618,766, filed October 29, 1956; Magnetic Recording and Play-Back Systems, Ser. No. 682,535, filed September 6, 1957, and Electromagnetic Transducers, Ser. No. 787,911, filed Jan. 20, 1959, and for basic information on the subject of play-back devices of the kind under consideration reference may be had to my above identified patent applications.

Another object of the invention is to provide an improved play-back device comprising a structure in the nature of an antifriction bearing adapted to change the speed or time of play-back without changing the pitch of the sounds on the record.

Another object of the invention is to provide a play-back device having simple and inexpensive mechanical means including an antifriction bearing for adjusting the relative velocity between a rotatable multiple play-back head and an elongated magnetic record to a desired value, and then maintaining that value constant as long as desired.

One solution to the problem of establishing predetermined fixed values of relative velocity between a rotatable multiple play-back head and an elongated magnetic audio record has been given in my aforementioned copending patent application Ser. No. 618,766. According to this application the required relative velocity between the rotatable multiple play-back head and the driving shaft for the capstan by which the magnetic tape is being driven is achieved by a device in the nature of an electric differential. This differential includes a synchronous motor having a stator and a rotor which are both rotatable relative to a frame structure by which they are supported. One of these two parts is driven by an auxiliary synchronous motor, and thereafter both parts have a different velocity relative to their supporting frame structure but maintain a constant relative velocity as in the case of any standard synchronous motor. One of the aforementioned parts of the synchronous motor drives the rotatable multiple play-back head while the other drives the shaft for the capstan, or an equivalent element by which the magnetic tape is being driven or advanced. An electric differential of this character is highly satisfactory for the intended purpose, and complies with the high technical requirements of broadcasting stations, but its cost of manufacture is relatively high.

It is, therefore, a special object of this invention to provide a mechanism which performs in essentially the same fashion as the above mentioned electric differential but is less expensive to manufacture and may be manufactured at such low cost as to make it possible to incorporate it in such devices as, for instance, relatively inexpensive dictating machines.

Another object of the invention is to provide a dictating machine for use by typists, allowing to control the speed of play-back in accordance with the particular needs, or requirements, or the particular ability of any given typist, and which machine does not affect the nature of the sounds which are recorded on an elongated magnetic record when the speed of play-back thereof is changed.

The invention will be more fully understood from the following description of the accompanying drawings showing several embodiments of this invention.

Figure 3:
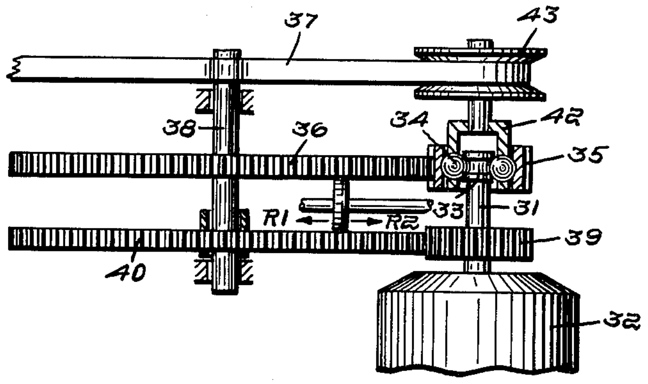
Figure 4:
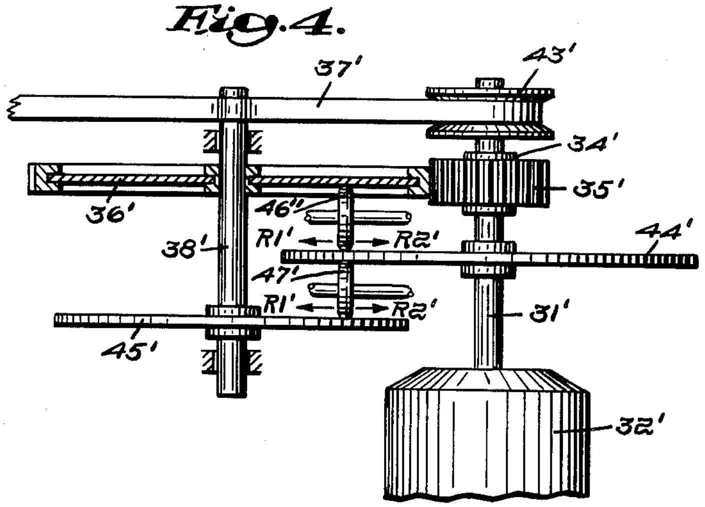

FIG. 3 refers to another embodiment of the invention which is shown therein in part in vertical section and in part in side elevation; and FIG. 4 is still another embodiment of the invention shown partly in vertical section and partly in side elevation.

Figure 1:
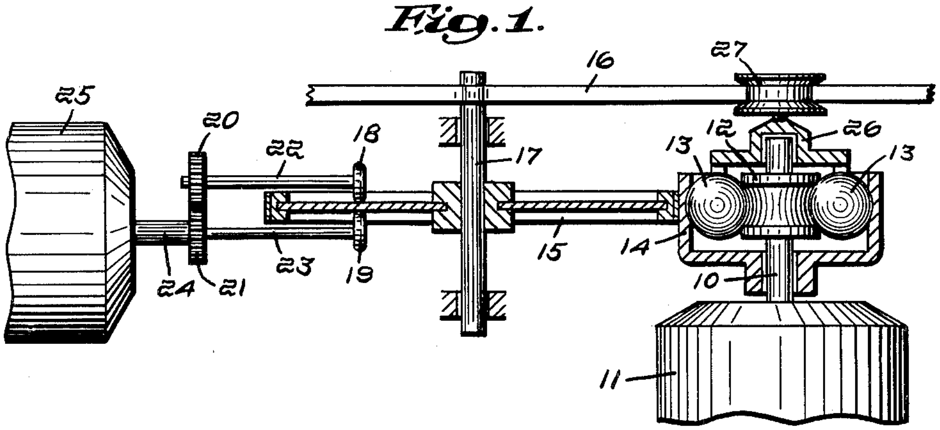
FIG. 1 illustrates a first embodiment of the invention partly in side elevation and partly in a vertical section.
Figure 2:
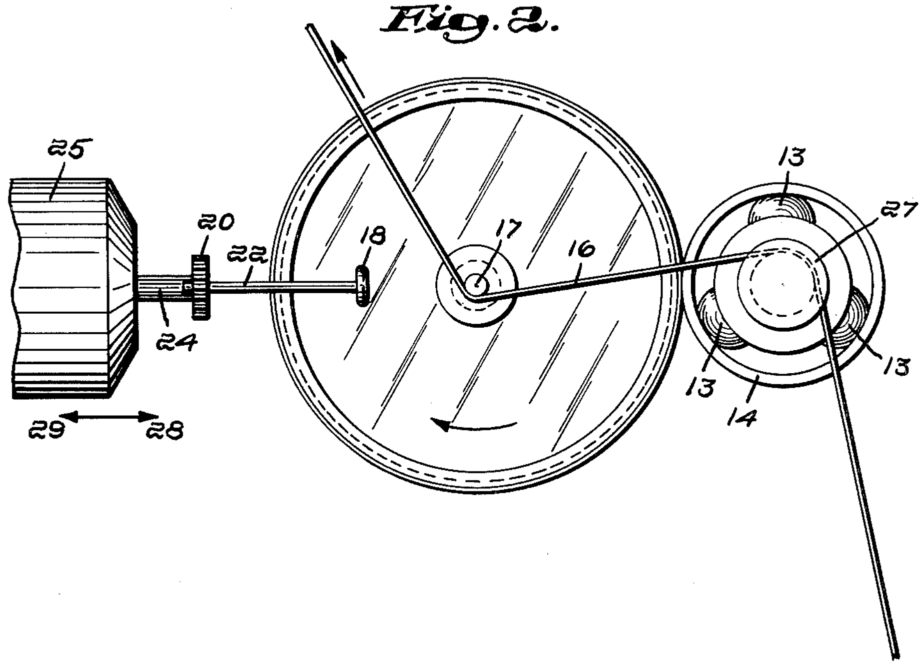
FIG. 2 is a top-plan view of the structure shown in FIG. 1.

Referring now to the drawings, and more particularly to FIGS. 1 and 2 thereof, numeral 10 has been applied to indicate a shaft being driven at a fixed or constant speed by electric motor 11 which, for instance, may be an asynchronous motor. Antifriction or ball bearing 13 is arranged above motor 11 and comprises an inner ring or inner raceway 12 and the outer ring or outer raceway 14. The inner ring or inner raceway 12 is integral with shaft 10 and the outer ring or outer raceway 14 is in cooperative frictional engagement with disc 15 rotatably mounted on shaft 17. Shaft 17 drives the magnetic tape or wire 16 which angularly frictionally engages the upper end of shaft 17. If desired a capstan and a pressure roller (both not shown) may be arranged at the upper end of shaft 17 at the region thereof where the record 16 to be driven is situated.

Reference numerals 18 and 19 have been applied to designate a pair of wheels or rollers mounted on shafts 22 and 23 and frictionally respectively engaging the upper and the lower surface of disc 15. Shafts 22 and 23 are operatively related by means of a pair of small spur gears 20, 21 which are mounted thereon. Shaft 23 is adapted to be driven at a constant velocity by an electric motor 25. Motor 25 may be an asynchronous motor and its shaft 24 is arranged in alignment with shaft 23. Motor 25 is adapted to be shifted selectively to the left or right, as seen in FIGS. 1 and 2 and indicated therein by the arrows 29 and 28. When motor 25, shafts 24, 23 and 22 and wheels or rollers 19, 18 are shifted in the direction of either of the two arrows 28, 29, the points of engagement between wheels or rollers 18, 19 and disc 15 are moved along a radius of disc 15, and consequently the transmission ratio of shafts 24 and 17 is changed. In other words, friction gears 15, 18, 19 are a means adapted to change continuously the gear ratio or transmission ratio between shafts 24 and 17, and thus to alter the velocity at which the record 16 is being driven.

FIGS. 1 and 2 show wheels or rollers 18, 19 arranged in an intermediate position midway between the radially outer position thereof and the radially inner position thereof. That position of wheels or rollers 18, 19 corresponds to a play-back of tape 16 at normal or average play-back speed. If wheels or rollers 18, 19 are moved to the right, i.e. in the direction of arrow 28, this results in an increase of speed of tape-driving shaft 17 or, in other words, in an increase of the velocity of play-back and a concomitant shortening of the time of play-back. On the other hand, if the wheels or rollers 18, 19 are moved to the left, i.e. in the direction of the arrow 29, this results in a decrease of the speed of the tape-driving shaft 17 or, in other words, in a decrease of the velocity of play-back and a concomitant lengthening of the time of play-back.

The radially outer ring or raceway 14 of ball bearing 13 which is in frictional driving engagement with disc 15 rotates at a velocity being at a fixed ratio to the velocity of disc 15. The cover of the antifriction or ball bearing 13 and its cage form an integral part 26 whose velocity is an intermediate between the velocity of the inner ring or raceway 12 and the velocity of the outer ring or raceway 14. The integral cage-cover part 26 supports a rotatable multiple electro-magnetic transducer head 27 of the kind more fully described in my aforementioned co-pending patent applications. It forms also an internal recess accommodating the upper end of shaft 10. This arrangement of parts shown in FIGS. 1 and 2 results in a movement of tape 16 past the rotatable transducer 27 for scanning the same at a relative velocity which remains constant as long as wheels or rollers 18, 19 remain in a given position.

The numbers of revolutions of motors 11 and 25 which are constant are selected in such fashion that in the relative position of parts 15, 18, 19 illustrated in FIGS. 1 and 2 the balls of the ball bearing 13 roll along their rings or raceways 12 and 14 without causing the composite cage and cover part 26 to rotate. Therefore transducer 27 does not rotate as long as parts 15, 18, 19 remain in the positions which are illustrated in FIGS. 1 and 2.

If the play-back time of a given tape record is to be shortened, motor 25 and wheels 18, 19 are jointly moved in the direction of arrow 28, resulting in an increase of the velocity of shaft 17 and of tape 16. As a result of this change of position of the constituent parts of the device, part 26 and transducer 27 are caused to rotate in the same direction as tape 16 is being moved by shaft 17. As a result of that rotation of transducer 27 the relative velocity between the latter and that of tape 16 remains unchanged, though the absolute velocity of tape 16 has been increased.

If, on the other hand, the play-back time of a given tape record is to be increased, motor 25 and wheels 18, 19 are jointly moved in the direction of arrow 29, i.e. to the left as seen in FIGS. 1 and 2. This movement of wheels 18, 19 away from shaft 17 results in a decrease of the velocity of shaft 17, and in a concomitant decrease of the velocity of tape 16. The change in the positioning of wheels 18, 19 relative to disc 15 results in a decrease of the speed at which the outer ring or outer raceway 14 is being driven by disc 15. Hence the composite cage and cover part 26 is rotated in a direction which is opposite to the direction in which tape 16 is being driven by shaft 17. As a result of that rotation of transducer 27 the relative velocity between the latter and tape 16 remains unchanged, though the absolute velocity of tape 16 has been decreased. The aforementioned constancy of the relative velocity between transducer 27 and tape 16 maintains the pitch of all sounds as originally recorded on tape 16, in spite of the fact that the play-back time has been increased, or stretched.

The structures of FIGS. 3 and 4 differ from those of FIGS. 1 and 2 in that the structures of FIGS. 3 and 4 comprise but one single electric motor which performs the function of driving the tape as well as the function of driving the rotatable multiple head transducer for scanning the tape.

Referring now to FIG. 3, numeral 32 has been applied to indicate the aforementioned dual function motor. An antifriction or ball bearing 34 which operates in the fashion of a differential gear is arranged above motor 32. The shaft 31 of motor 32 has a constant number of revolutions. The inner ring or inner raceway 33 of ball bearing 34 is an integral part of shaft 31. The outer ring or outer raceway 35 of ball bearing 34 forms a toothed gear meshing with gear 36 mounted on tape-driving-shaft 38. The latter may directly engage tape 37, as shown, or support a conventional capstan mechanism for driving tape 37.

In addition to the radially inner raceway 33 shaft 31 of motor 32 supports a pinion 39 meshing with spur gear 40 loosely mounted on tape-driving-shaft 38. The two spur gears 36, 40 are substantially in the shape of flat discs. Wheel or roller 41 is arranged in the space bounded by gears 36, 40 and frictionally engages both of said gears 36, 40. Friction wheel 41 is adapted to be moved radially inwardly or radially outwardly, as indicated by the two arrows $R_1$ and $R_2$. Pinion 39 drives spur gear 40 which, in turn, drives wheel 41. The latter drives spur gear 36 which is fixedly mounted on shaft 38. The position of wheel 41 relative to gears 36 and 40, i.e. the fact whether wheel 41 remains in the position shown in FIG. 3 or is shifted from its position shown in FIG. 3 in the direction of either of the two arrows $R_1$ or $R_2$ determines the transmission ratio between driving shaft 31 of motor 32 and the tape-driving-shaft 38. Moving of wheel 41 to the left, or in the direction of arrow $R_1$, results in an increase of the speed or number of revolutions of shaft 38 and, therefore, in a shortening of the time of play-back of any given magnetic record 37. On the other hand, if wheel 41 is shifted to the right or in the direction of arrow $R_2$, this results in a reduction of the speed or number of revolutions of shaft 38 and, therefore, in an increase of the time of play-back of any given record 37.

The cage or ball bearing 34 and the cover thereof are integrated into one single part which is rotatable and supports the rotatable multiple magnetic play-back head or electromagnetic transducer 43.

The structure of FIG. 4 is of a nature very similar to that shown in FIG. 3. As shown in FIG. 4 motor 32' is provided with a shaft 31' supporting a friction disc 44'. The antifriction or ball bearing mechanism 34' of FIG. 4 (not fully shown therein) is identical to the roller bearing mechanism 34 shown in FIG. 3. The radially outer ring or outer raceway 35' of ball bearing mechanism 34' engages spur wheel 36' fixedly mounted on tape-driving-shaft 38'. The cage of ball bearing 34' supports a rotatable multiple head transducer 43' engaged by the tape record 37'. The latter is driven by shaft 38', either directly, or by the intermediary of appropriate capstan means.

Friction disc 44' is engaged on the upper side thereof by a wheel or roller 46' which engages also the lower surface of spur wheel 36'. The lower surface of friction disc 44' is in engagement with a wheel or roller 47' identical with wheel or roller 46'. Wheel or roller 47' engages frictionally a friction disc 45' fixedly mounted on tape-driving-shaft 38'. Wheels or rollers 46', 47' are jointly movable either radially inwardly in the direction of arrows $R_1'$, or radially outwardly or in the direction of arrows $R_2'$. When so moved the points of engagement between wheels 46' and 47' and parts 36' and 45' move along radii of parts 36' and 45'.

Friction disc 44' transmits the torque of shaft 31' to wheels 46' and 47'. Wheel 46' drives spur gear 36' and the latter drives shaft 38'. Wheel 47' drives friction disc 45′ and the latter also drives shaft 38′. Therefore the tape-driving-shaft 38′ is being driven by the shaft 31′ of motor 32′ and the transmission ratio between shafts 31′ and 38′ depends upon the position of wheels 46′, 47′ relative to parts 36′ and 45′.

The shaft 31′ of motor 32′ and the inner ring or raceway of ball bearing 34′ are integral parts, as more fully explained in connection with FIG. 3, while the integral cage and cover of ball bearing 34′, also conforming with the arrangement of parts shown in FIG. 3, supports the rotatable multiple play-back head or electromagnetic transducer 43′.

In the position of wheels 46′ and 47′ shown in FIG. 4 the inner ring or raceway integral with shaft 31′ and the outer ring or raceway 35′ meshing with spur wheel 36′ are rotated in opposite directions. Under such conditions the balls of ball bearing 34′ roll on the radially inner raceway and on the radially outer raceway 35′ and the cage of the ball bearing 34′ remains at rest, i.e. it does not rotate. Therefore the play-back head 43′ which is integral with the cage of ball bearing 34′ remains also at rest.

Moving of wheels 46′ and 47′ in the direction of arrow $R_2'$, i.e. toward the periphery of friction disc 45′, results in a reduction of the speed, or number of revolutions, of tape-driving-shaft 38′ and, therefore, in a lengthening of the play-back time. Under such conditions ball bearing 34′ operates in the fashion of a differential gear, or as a differential gear, driving the multiple play-back head 43′ in such a fashion as to maintain a relative velocity between the latter and the recording tape 37′ which is the same as the relative velocity between parts 43′ and 37′ prior to shifting of wheels 46′ and 47′. In case that the wheels 46′ and 47′ are shifted in the direction of arrow $R_1'$ the speed, or number of revolutions, of tape-driving-shaft 38′ is increased and the time of play-back is reduced.

It will be apparent that the rotatable scanning heads 27, 43 and 43′ have a substantially cylindrical surface adapted to be engaged by the magnetic record. The axes of rotation of scanning heads 27, 43 and 43′ and the record-driving-shafts are preferably parallel. The electric motors driving the rotatable scanning heads 27, 43 and 43′ are arranged coaxially with respect to ball bearings 13, 34, 34′.

It will be further apparent to anyone skilled in the art that in the above described mechanical differential mechanisms rollers or equivalent solids of revolution might be substituted for the balls.

It will be understood that I have illustrated and described herein preferred embodiments of the invention and that various alterations may be made in the details thereof without departing from the spirit and scope of my invention as defined in the appended claims.

I claim as my invention:

1. A play-back device for changing the speed of play-back of elongated magnetic audio records of intelligence without changing the pitch thereof comprising a rotatable scanning head for the magnetic record; a rotatable record-driving-shaft; differential gear means for maintaining a constant relative velocity between said scanning head and said record-driving-shaft, said differential gear means including a plurality of solids of revolution, a pair of raceways, and a cage for said solids of revolution; said cage and said scanning head being mechanically connected together for joint rotation thereof; a motor having a constant number of revolutions; means for positively driving one of said pair of raceways by said motor; gear means having a constant gear ratio interposed between said record-driving-shaft and the other of said pair of raceways; and means for driving said record-driving-shaft including selectively adjustable variable gear ratio friction gear means.

2. A play-back device as specified in claim 1 wherein said adjustable variable gear ratio friction gear means include a friction disc, a pair of friction wheels frictionally engaging opposite surfaces of said friction disc, gear means for jointly driving said pair of friction wheels, and means for selectively shifting said pair of friction wheels along a radius of said friction disc.

3. A play-back device as specified in claim 1 wherein said adjustable variable gear ratio friction gear means is interposed between said record-driving shaft and said means for positively driving one of said pairs of raceways by said motor.

4. A play-back device as specified in claim 1 wherein said adjustable variable gear ratio friction gear means include a spur gear forming an integral part of said gear means having a constant gear ratio, said spur gear comprising a surface adapted to form a friction disc; a friction wheel frictionally engaging said surface; means for selectively shifting said friction wheel along a radius of said spur gear; an additional friction disc loosely mounted on said record-driving shaft; and positive means for causing joint rotation of said additional friction disc with said motor and said one of said pair of raceways.

5. A play-back device as specified in claim 1 wherein said adjustable variable gear ratio friction gear means include a friction disc fixedly mounted on the shaft of said motor; at least one friction wheel frictionally engaging said friction disc; means for shifting said friction wheel along a radius of said friction disc; a spur gear fixedly mounted on said record-driving-shaft and comprising a surface adapted to form a friction disc; a gear means on said other of said raceways meshing with said spur gear.

6. A play-back device for changing the speed of play-back of elongated magnetic audio-records of intelligence without changing the pitch thereof comprising a rotatable scanning head having a substantially cylindrical surface coaxial with the axis of rotation thereof adapted to be engaged by the magnetic record; a rotatable record-driving-shaft arranged parallel to said axis of rotation of said scanning head; a ball bearing including a pair of raceways and a cage for the constituent balls thereof; means on said cage for supporting said scanning head by said cage; gear means having a constant gear ratio interposed between said record-driving-shaft and one of said pair of raceways; an electric motor; means for positively driving said other of said pair of raceways by said motor; and means for driving said record-driving-shaft including selectively adjustable friction gear means having a variable gear ratio.

7. A play-back device as specified in claim 6 wherein said electric motor drives both said scanning head and said record-driving-shaft.

8. A play-back device for changing the speed of play-back of elongated magnetic audio-records of intelligence without changing the pitch thereof comprising a rotatable scanning head adapted to be engaged by the magnetic record; a rotatable record-driving-shaft; an antifriction type bearing including a plurality of solids of revolution, a cage structure for said plurality of solids of revolution, an outer raceway for said plurality of solids of revolution and an inner raceway for said plurality of solids of revolution; means on said cage for causing joint rotation of said scanning head with said cage; gear means having a constant gear ratio interposed between said record-driving-shaft and said outer raceway; an electric motor; means for positively driving said inner raceway by said motor; and means for driving said record-driving-shaft by said motor, said last-mentioned means including selectively adjustable friction gear means having a variable gear ratio.

9. A play-back device for changing the speed of play-back of audio-records of intelligence on magnetic tape without changing the pitch thereof comprising a rotatable scanning head adapted to be engaged by a magnetic tape; a rotatable tape-driving-shaft; a ball bearing including a plurality of balls, a cage structure for said plurality of balls supporting said scanning head, an outer raceway for said plurality of balls, and an inner raceway for said plurality of balls; a transmission having a constant gear ratio interposed between said tape-driving-shaft and said outer raceway; an electric motor arranged in coaxial relation with said ball bearing; means for positively driving said inner raceway by said motor; and a selectively adjustable friction gear mechanism having a variable gear ratio interposed between said motor and said tape-driving-shaft for driving said tape-driving-shaft by said motor at various constant speeds.

No references cited.